United States Patent [19]
Prasse

[11] 3,827,838
[45] Aug. 6, 1974

[54] OIL SEAL FOR ROTARY PISTON ENGINES
[75] Inventor: Herbert F. Prasse, Town & Country, Mo.
[73] Assignee: Ramsey Corporation, St. Louis, Mo.
[22] Filed: Jan. 5, 1973
[21] Appl. No.: 321,445

[52] U.S. Cl. ............................................... 418/142
[51] Int. Cl. ........................................... F04c 27/00
[58] Field of Search ........ 418/122, 142, 144; 277/86

[56] References Cited
UNITED STATES PATENTS

| | | | |
|---|---|---|---|
| 1,927,543 | 9/1933 | Doyle | 277/86 X |
| 3,179,331 | 4/1965 | Paschke et al. | 418/142 X |
| 3,180,563 | 4/1965 | Jones et al. | 418/142 X |
| 3,185,386 | 5/1965 | Peras | 418/142 X |

FOREIGN PATENTS OR APPLICATIONS

| | | | |
|---|---|---|---|
| 1,173,746 | 7/1964 | Germany | 418/122 |
| 1,186,257 | 4/1970 | Great Britain | 418/142 |

*Primary Examiner*—C. J. Husar
*Assistant Examiner*—Leonard Smith
*Attorney, Agent, or Firm*—Hill, Gross, Sherman, Simpson, Van Santen, Steadman, Chiara & Simpson

[57] ABSTRACT

An oil seal for rotary piston engines wherein the oil control seal is received in a piston groove and has a secondary seal in an axial end face groove in the oil control seal, the secondary seal urged against the back wall of the piston groove by a spring.

16 Claims, 4 Drawing Figures

PATENTED AUG 6 1974  3,827,838
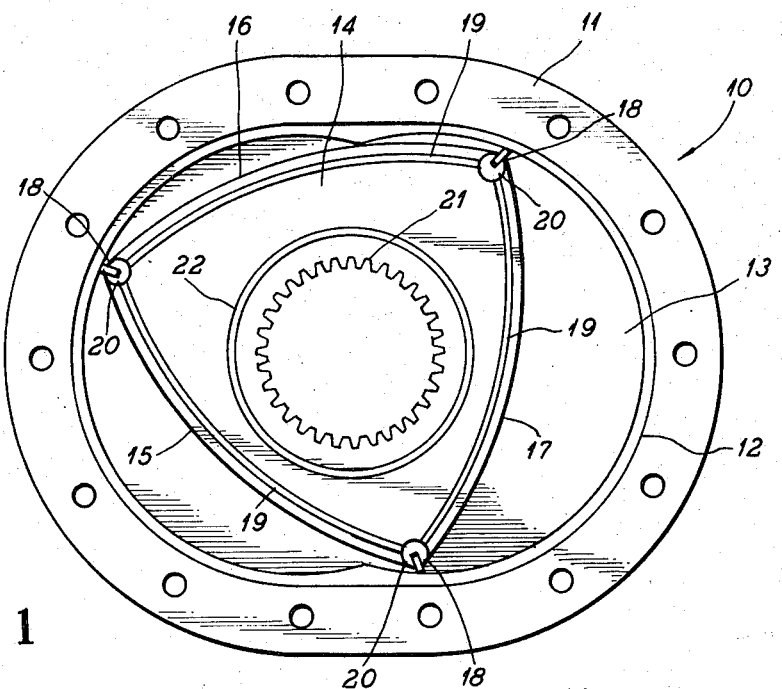
Fig. 1
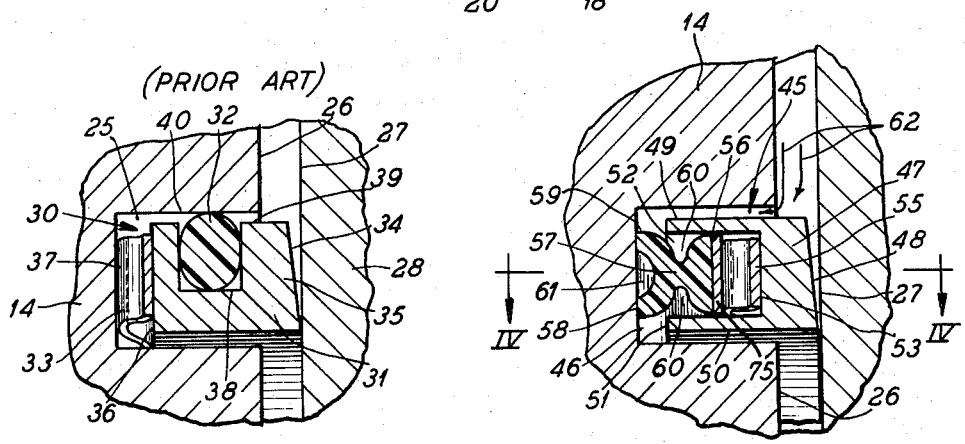
Fig. 2 (PRIOR ART)
Fig. 3
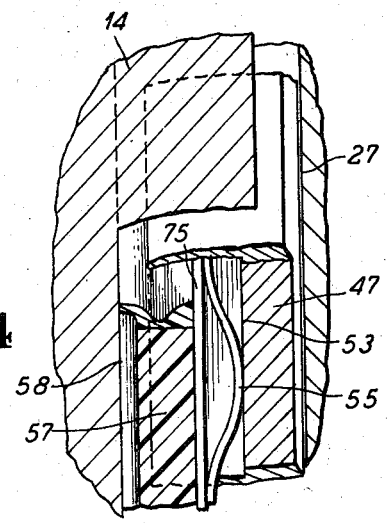
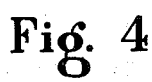
Fig. 4

OIL SEAL FOR ROTARY PISTON ENGINES

BACKGROUND OF THE INVENTION

This invention relates to seals and more particularly to an oil ring seal for rotary piston engines.

PRIOR ART

Rotary piston engines, such as the Wankel engine, present unique sealing problems. In the Wankel type engine, a rotor or rotary piston is received in a figure eight-shaped housing between end plates. The center of the rotor is open and the shaft is received therethrough. In order to lubricate the interface between the rotor and the shaft, the center of the rotor is normally supplied with an oil bath. It is necessary to prevent this oil from flowing radially outwardly to the working chambers at the periphery of the rotor. In order to accomplish this, it has been known to provide ring grooves in the side walls of the rotor and to insert oil ring seals in the groove. The oil ring seals are normally spring biased into sealing engagement with the opposed end plate.

In order to prevent a leakage path from opening through the groove behind the oil ring seal, it has been known either to bias the oil ring seal into engagement with the side walls of the ring groove or to provide a secondary seal member. Part of the problem with the first solution is the fact that it is necessary to provide not only a dynamic but a static state seal. When the engine is at rest, a leakage path can open around a dynamic seal. Because the center of the rotor contains oil even when the engine is at rest, the art has provided the second seals, primarily of the static seal type. The normal prior art secondary seal includes a groove in a side face of the seal ring in which the secondary seal member is received. The secondary seal ring has often been an O-ring. These rings have generally been oversized so as to seal between the side wall of the groove in the rotor and the side walls of the groove in the ring. This has resulted in an interference fit of the oil ring equipped with the secondary ring into the ring groove. During operation of the engine, the side walls of the rotor and walls of the end plate may vary in absolute parallelism. This produces a whobble between the side walls. In order to effectively seal, it is necessary that the seal ring be free to move inwardly and outwardly of the ring groove to follow the end plate. The provision of the prior art static seals imparts drag to the oil ring to limiting its ability to freely follow the end plate. This problem is aggravated by the fact that the space to be sealed is axial of the ring so that as the rotor rotates, the ring must be free to continuously move inwardly and outwardly of the ring groove.

BRIEF SUMMARY OF THE INVENTION

My invention overcomes the disadvantages of the prior art and provides an oil ring seal which has a sealing face at one axial end thereof and a groove into the body of the ring from the other axial end thereof with straight side walls intermediate the axial ends.

A secondary seal is positioned in the groove in the seal ring and contacts the back wall of the rotor groove. A spring is entrapped between the bottom wall of the seal ring groove and the secondary seal. In this manner the prior art contact between the secondary seal and the side wall of the rotor groove is eliminated.

In a preferred embodiment, the secondary seal is a resilient ring having radial grooves therein so that pressure acting against the axial walls of the ring will act to expand the ring axially into greater sealing contact with the back wall of the rotor groove and the back wall of the oil ring seal groove.

It is therefore an object of this invention to provide an improved oil seal ring for rotary piston engines.

It is a further object of this invention to provide a fluid seal between opposed surfaces of relatively moving members.

It is another and more particular object of this invention to provide a fluid seal including a primary seal member received in a groove in a first member and contacting a face of a second member exterior of the groove, the primary seal having an axial groove therein, a secondary seal received in the axial groove, a spring entrapped between the bottom wall of the groove in the primary seal and the secondary seal, and the secondary seal engaging the back wall of the groove in the primary member.

BRIEF DESCRIPTION OF THE DRAWINGS

FIG. 1 is a plan view of a rotary piston engine rotor and chamber;

FIG. 2 is a fragmentary cross-sectional view of a part of a prior art rotary piston and chamber showing the prior art oil seal;

FIG. 3 is a view similar to FIG. 2 illustrating the seal of this invention; and

FIG. 4 is a fragmentary sectional view taken along the lines IV—IV of FIG. 3.

DESCRIPTION OF THE PREFERRED EMBODIMENT

FIG. 1 illustrates a portion of a rotary piston engine 10 including a housing member 11 having an inner peripheral wall 12 defining a chamber 13 in which is disposed a rotary piston 14. The piston has three outer peripheral walls 15, 16 and 17 meeting at apexes 18. Adjacent the outer periphery are compression seals 19 which extend between apex seal assemblies 20. The rotor has a central opening at 21 therein extending axially through the rotor. Intermediate the central opening 21 and the outer periphery of the rotor is an oil seal 22.

As is illustrated in FIG. 2, in the prior art, an oil ring groove 25 was formed into the body of the rotor 14 from the side surfaces 26 thereof. One groove was formed on each side of the rotor in opposition to the sealing surfaces 27 of the end plates 28 which close the chamber 13. An oil seal ring assembly 30 was positioned in the groove. The assembly included an oil ring 31, a secondary seal ring 32 and a spring 33.

The oil ring 31 had a sealing face 34 formed on an axial end 35 thereof. The opposite axial end 36, received in the groove 25, was acted upon by the wave spring 33 entrapped between the face 36 and the back wall 37 of the groove 25. The seal ring 31 had a radial groove 38 extending thereinto from the radially outer surface 39. The secondary seal ring 32 was received in the groove 38 and entrapped between the walls of the groove 38 and the radially outer wall 40 of the groove 25. The secondary seal ring 32 was normally an O-ring.

Such prior art devices as illustrated in FIG. 2 had to continuously maintain contact with the wall 40 of the groove 25 in order to prevent a leakage path opening around the ring in the groove 25. In order to maintain this contact, the prior art normally relied upon the use of oversized O-rings which were then compressed into position. This type of secondary seal creates a drag against the surface 40 of the ring groove 25 which prevents the oil ring seal 31 from freely moving inwardly and outwardly of the groove. Since absolute parallelism is not always maintained between the surfaces 26 and 27, this resulted in an inability of the oil ring 31 to always maintain contact between the sealing face 37 and the surface 27 of the end plate 28. This was especially acute during high speed operation.

FIG. 3 illustrates the ring assembly 45 of this invention. The assembly is received in an oil ring groove 46 which extends into the body of the rotor 14 from the side walls 26 thereof. The assembly consists of an oil ring seal 47 having a sealing face 48 projecting from the groove and radially outer 49 and inner 50 peripheral walls and a back axial end wall 51 remote from the sealing face 48. A groove 52 extends axially into the ring from the back wall 51 intermediate the inner and outer peripheral walls 49 and 50. The groove 52 terminates in a radial back wall 53. A spring means, such as a wave spring 55, is received in the groove 52 and is interposed between the back wall 53 and an axial end wall 56 of a secondary seal 57. The other axial end wall 58 of the seal 57 bottoms against the back wall 59 of the rotor groove 46. In a preferred embodiment, a flat washer 75 is positioned between the spring 55 and the secondary seal 57 to even out the pressure of the spring around the entire face of the seal 57.

In the preferred embodiment illustrated, the secondary seal 57 has radial grooves 60 extending thereinto from the inner and outer peripheral walls and an axial groove 61 extending thereinto from the back wall 58. The portion of the secondary seal 57 between the front wall 56 and the radial grooves 60 is dimensioned to be snuggly received in the groove 52. The provision of a radial groove 60 allows the seal 57 to expand axially in the presence of pressure filling the grooves. In this manner, if compression gases pass the compression rings 19 and enter the oil ring groove 46, as illustrated by the arrows 62, they will act in the radial groove 60 at that side of the secondary ring 57 to increase the seal of the secondary ring against the back wall 59 of the ring groove and against the wave spring 55. The pressure against the wave spring 55 will cause expansion of the portion of the ring 57 between the radial grooves 60 and the wave spring so that the secondary seal seals more tightly against the walls of the groove 52.

It is to be understood that the secondary seal ring 57 illustrated in FIG. 3 is a preferred embodiment and that the seal assembly 45 of this invention could be used with other secondary seal rings, such as O-rings and quad rings. It is desirable however that the secondary seal ring 57 be an elastomeric ring capable of conforming with the groove so as to be in sealing engagement with the side walls of the groove 52 in the oil ring 57 and with the back wall 59 of the rotor groove 46.

It will be appreciated that the sealing assembly 45 of this invention does not create a friction drag between the ring and the walls of the rotor groove. Further, because the spring acts directly on the secondary seal and on the oil ring seal, relative movement therebetween can easily occur to allow the oil ring seals to move inwardly and outwardly out of the rotor groove to effectuate a continuous seal against the surface 27 of the end plate.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. An oil ring seal assembly for rotary piston engines, comprising:
   a rectangular cross section annular oil seal;
   said oil seal having axial end walls;
   one of said axial end walls being a sealing face;
   the other of said axial walls having an axial groove therein extending into the body of the annular oil seal;
   a secondary seal ring received in said axial groove and projecting therefrom;
   said axial groove having a bottom wall and said secondary seal ring having an axial end face received in said groove and facing toward said bottom wall;
   a wave spring entrapped between said bottom wall and said end face of said secondary seal ring;
   radially inner and outer peripheral surfaces of said secondary seal ring in sealing engagement with radially inner and outer walls of said groove; and
   said secondary seal ring being expansible and having radial grooves extending thereinto intermediate the axial ends thereof, said grooves providing for axial expansion of of the secondary seal under the influence of high pressure in the said radial grooves.

2. An assembly according to claim 1, wherein said seal ring comprises an elastomeric material, and a flat washer is interposed between said seal ring and said wave spring.

3. In a sealing assembly for a rotary piston engine comprising a ring groove in a side wall of said rotary piston, an oil ring seal assembly in said ring groove, said ring groove having a radially extending back wall and axially extending radially inner and outer side walls, said oil ring assembly including an oil ring seal, said oil ring seal having axial end walls and radially inner and outer side walls, one of said axial end walls of said oil ring seal comprising a sealing surface, the improvement comprising:
   the other of said axial end walls of said oil ring seal having an axial groove extending into the body of the oil ring seal;
   said axial groove having a radially extending back wall and axially extending radially inner and outer walls;
   said oil ring seal received with axial clearance in said ring groove and being free to move axially in said ring groove;
   a secondary seal comprising a ring of elastomeric material in said axial groove;
   portions of the secondary seal ring extending out of said axial groove, and beyond said other end wall of said oil ring seal;
   portions of the said secondary seal being in sealing engagement with the back wall of said ring groove and with the radially inner and outer walls of the said axial groove;

and a spring means entrapped between the said back wall of the said axial groove and the said secondary seal, said spring means being effective to urge said oil ring seal out of said groove in said rotor.

4. In a sealing assembly according to claim 3, a flat washer interposed between said spring means and said secondary seal.

5. In a fluid seal assembly for sealing against fluid flow between opposed surfaces of two relatively moving parts wherein one of the parts has an outwardly opening groove, a seal member received in said groove, a first end face of said member exterior of said groove engaging the surface of the other part, and a second end face of said member on an end opposite the first face, the improvement comprising:
   the second end face of said member having an inwardly opening groove therein in opposition to an outwardly facing wall in said outwardly opening groove;
   an elastomeric secondary seal received in said inwardly opening groove in sealing engagement with side walls of said inwardly opening groove and having a first surface facing toward a back wall of said inwardly opening groove;
   a second surface on said secondary seal opposite said first surface and engaging in sealing relation against said outwardly facing wall in the outwardly opening groove;
   and a spring means entrapped between said back wall and said secondary seal and acting against said first surface of the secondary seal;
   the spring means being effective to urge said seal member outwardly relative to the outwardly opening groove and to urge the secondary seal outwardly relative to said inwardly opening groove and causing the secondary seal to expand into sealing engagement with said side walls.

6. In a fluid seal assembly according to claim 5, said secondary seal having a groove in at least one side thereof intermediate said first and second surfaces.

7. In a fluid seal assembly according to claim 5, a flat washer interposed between said spring means and said secondary seal to even out pressure of the spring means against said first surface of the secondary seal.

8. In a fluid seal assembly according to claim 5, said secondary seal having a groove in said second surface intermediate the opposite sides of the secondary seal.

9. In a fluid seal assembly according to claim 8, said secondary seal having at least one groove in one side thereof intermediate said first and second surfaces.

10. In a fluid seal assembly according to claim 8, said secondary seal having oppositely opening grooves in respective opposite sides of the secondary seal member and intermediate said first and second surfaces.

11. An oil ring seal assembly for rotary piston engines, comprising:
   a rectangular cross section annular oil seal;
   said oil seal having axial end walls;
   one of said axial end walls being a sealing face;
   the other of said axial walls having an axial groove therein extending into the body of the annular oil seal;
   an elastomeric secondary seal ring received in said axial groove and projecting therefrom;
   said axial groove having a bottom wall and said secondary seal ring having an axial end face received in said groove and facing toward said bottom wall;

a wave spring entrapped between said bottom wall and said end face of said secondary seal ring; and radially inner and outer peripheral surfaces of said secondary seal ring in sealing engagement with radially inner and outer walls of said groove.

12. An assembly according to claim 11, wherein said seal ring has an annular groove in at least one of said radially inner and outer peripheral surfaces.

13. An assembly according to claim 11, including a flat washer between said wave spring and said end face of said seal ring.

14. An assembly according to claim 11, wherein said seal ring has an axially inwardly opening annular groove in its end which projects from said axial groove.

15. An assembly according to claim 14, wherein said seal ring has at least one radially opening annular groove in one radially facing surface thereof.

16. An assembly according to claim 14, wherein said seal ring has annular grooves in both of said radially inner and outer peripheral surfaces.

* * * * *